United States Patent [19]

Daniels

[11] Patent Number: 5,083,395

[45] Date of Patent: Jan. 28, 1992

[54] CRAB CAGE AND POLE APPARATUS

[76] Inventor: Angela F. Daniels, 1301 Corbett St., Wilmington, N.C. 28401

[21] Appl. No.: 694,770

[22] Filed: May 2, 1991

[51] Int. Cl.$^5$ .............................................. A01K 97/10
[52] U.S. Cl. ...................................... 43/27.4; 43/21.2; 43/103; 248/530; 254/334; 212/254; 212/223
[58] Field of Search .................... 43/5, 21.2, 27.4, 103, 43/4; 248/530, 533; 212/223, 230, 254, 267; 254/334, 338, 335, 336

[56] References Cited

U.S. PATENT DOCUMENTS

| | | | |
|---|---|---|---|
| 274,527 | 3/1883 | Stelle | 212/230 |
| 952,812 | 3/1910 | Jorgensen | 43/21.2 |
| 1,354,745 | 10/1920 | Henderson | 212/254 |
| 2,624,972 | 1/1953 | Burg | 43/27.4 |
| 2,792,658 | 5/1957 | Stafford | 43/27.4 |
| 2,859,881 | 11/1958 | Coryell | 212/254 |
| 2,888,770 | 6/1959 | Patrick | 43/27.4 |
| 3,181,707 | 5/1965 | Janssen | 254/338 |
| 4,642,931 | 2/1987 | Flores | 43/21.2 |

FOREIGN PATENT DOCUMENTS 24222  12/1921  France ................................ 43/103

Primary Examiner—Kurt Rowan
Attorney, Agent, or Firm—Leon Gilden

[57] ABSTRACT

The present invention provides a pole member organization, wherein a plurality of vertical posts are fixedly secured together joined at their upper terminal end to an "L" shaped junction. The "L" shaped junction includes a first horizontal post telescopingly receiving a second and third horizontal post. The first and second horizontal posts include guide slots that are longitudinally aligned, with the guide slots receiving an alignment eye and leg within each slot to guide each post in a telescoping relationship. A winding reel is mounted within the "L" shaped junction, with the "L" shaped junction including an aperture aligned with each eye to effect a winding and reeling of the associated crab trap to the post structure.

3 Claims, 4 Drawing Sheets

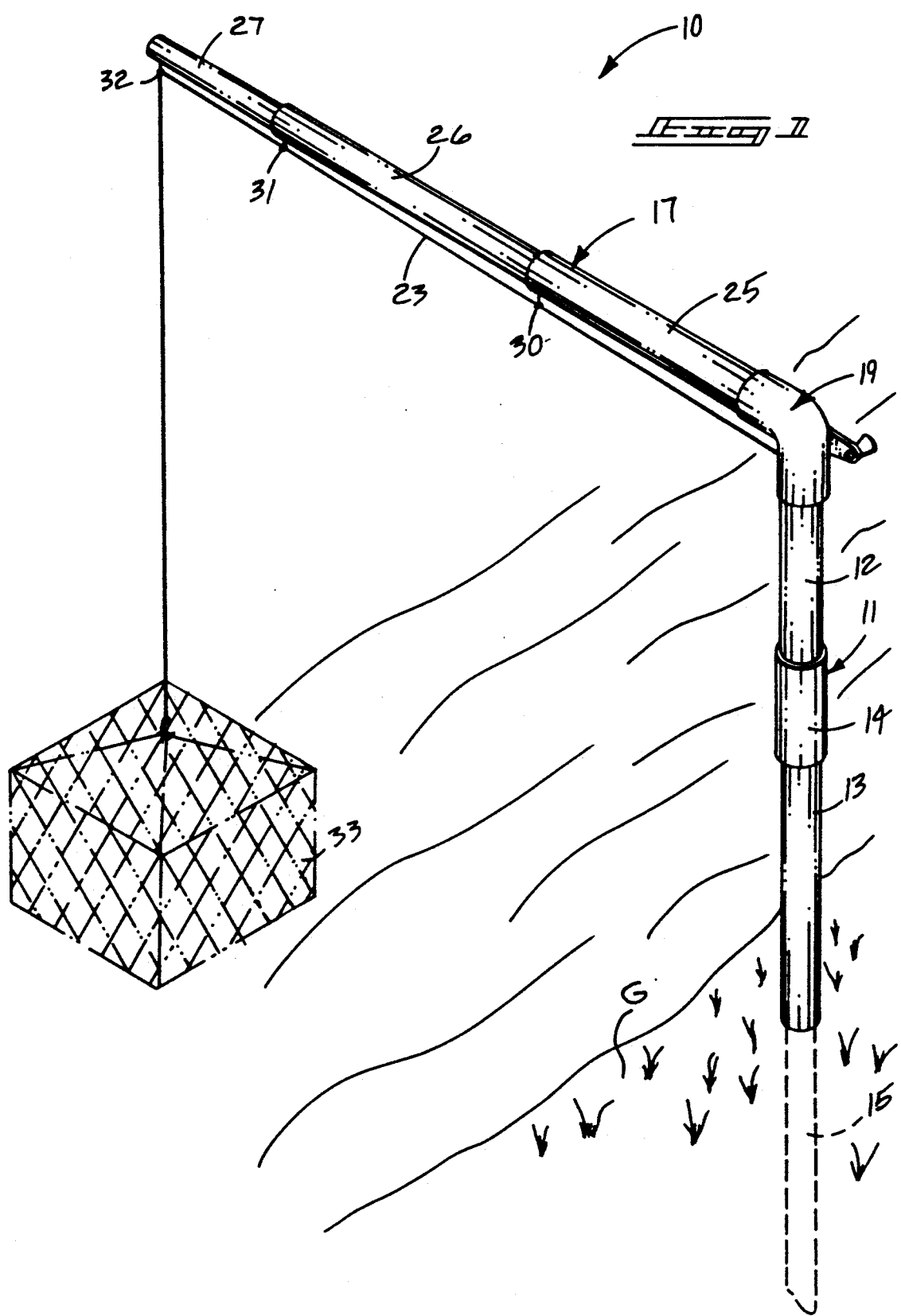

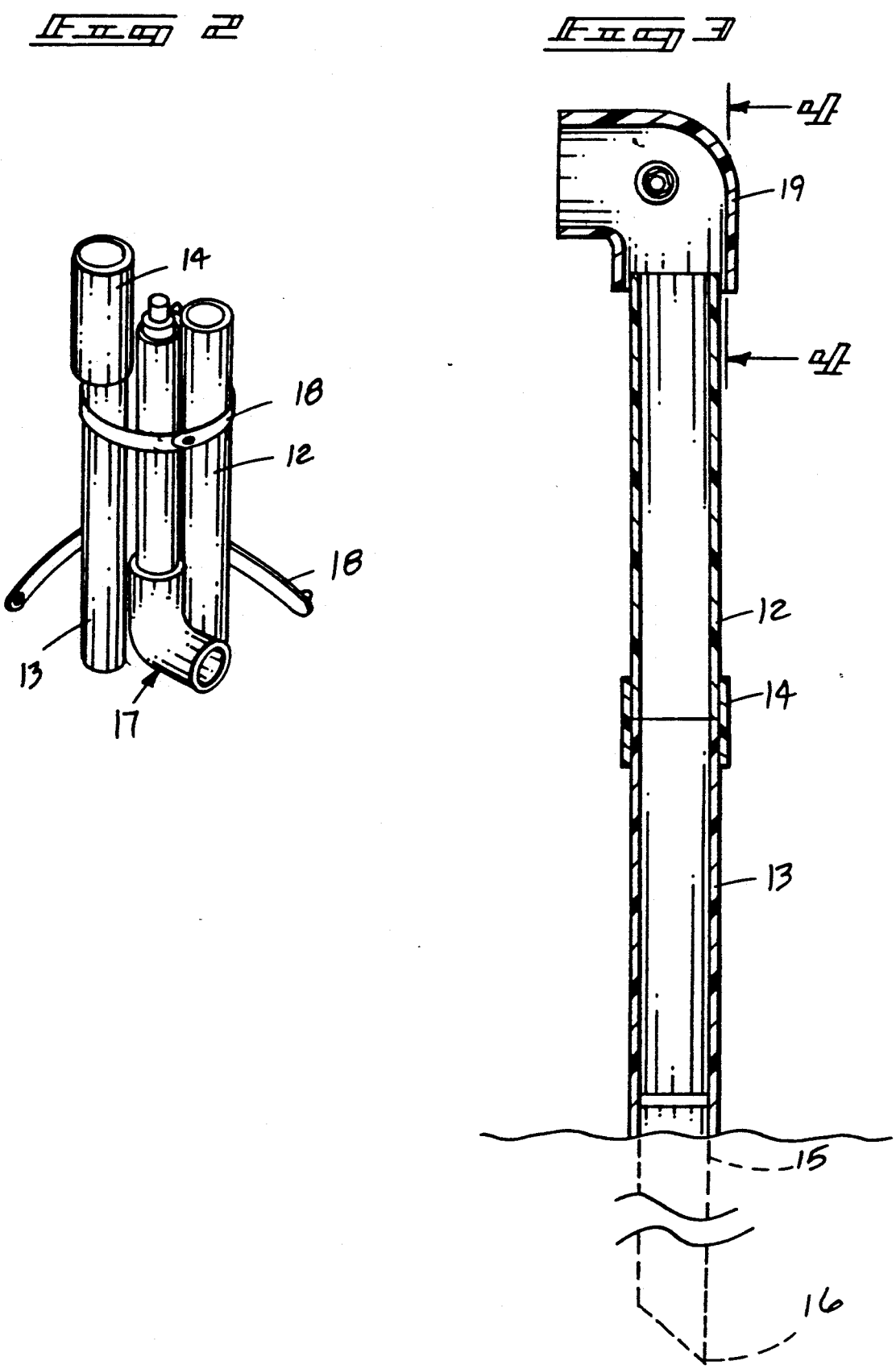

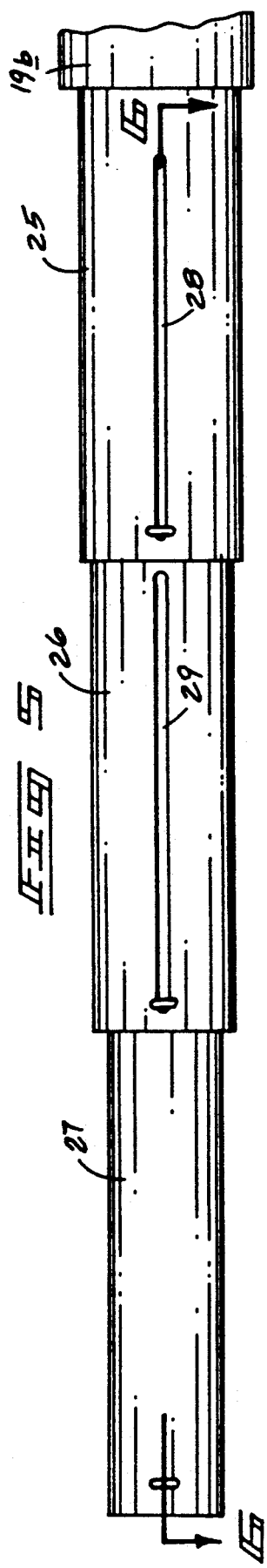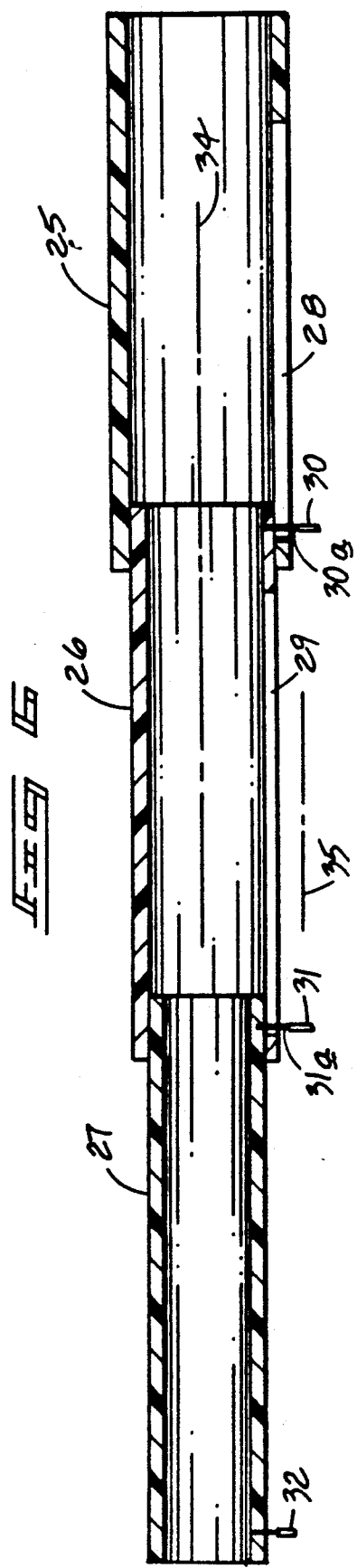

CRAB CAGE AND POLE APPARATUS

BACKGROUND OF THE INVENTION

1. Field of the Invention

The field of invention relates to crab trap retrieving apparatus, and more particularly pertains to a new and improved crab cage and pole apparatus wherein the same is arranged for an efficient and effective extraction of a crab cage relative to a body of water.

2. Description of the Prior Art

Positioning crab traps within bodies of water effects arduous and awkward retrieval of such crab traps, wherein such crab traps are typically positioned by marker buoys and are withdrawn from a body of water by use of a boat member that is floated relative to the crab trap to permit withdrawal of the crab trap from the body of water. The instant invention attempts to overcome deficiencies of the prior art by providing a convenient and efficient apparatus to permit selective positioning of the crab trap within the body of water and permitting a subsequent removal. Examples of prior art trap apparatus may be exemplified in U.S. Pat. No. 4,237,645 to Kinser setting forth a trap arrangement that is positioned to a bottom surface of a body of water, with a marker buoy directed upwardly from the trap to indicate its positioning.

U.S. Pat. No. 4,530,182 to Ponzo sets forth a crab trap of detailed construction utilizing a typical marker buoy, in a manner as discussed above.

U.S. Pat. No. 4,244,323 to Morimura sets forth an apparatus wherein various flotation members are arranged for sinking and floating a fish breeding netted tank relative to a body of water.

U.S. Pat. No. 4,587,758 to Ponzo sets forth a further crab trap arrangement, with a typical line directed upwardly through the body of water.

As such, it may be appreciated that there continues to be a need for a new and improved crab cage and pole apparatus as set forth by the instant invention which addresses both the problems of ease of use as well as effectiveness in construction in extraction and positioning of a crab cage relative to a body of water and in this respect, the present invention substantially fulfills this need.

SUMMARY OF THE INVENTION

In view of the foregoing disadvantages inherent in the known types of crab cage apparatus now present in the prior art, the present invention provides a crab cage and pole apparatus wherein the same utilizes a telescoping pole arrangement arranged for the ease of removal of a crab trap relative to a body of water. As such, the general purpose of the present invention, which will be described subsequently in greater detail, is to provide a new and improved crab cage and pole apparatus which has all the advantages of the prior art crab cage apparatus and none of the disadvantages.

To attain this, the present invention provides a pole member organization, wherein a plurality of vertical posts are fixedly secured together joined at their upper terminal end to an "L" shaped junction. The "L" shaped junction includes a first horizontal post telescopingly receiving a second and third horizontal post. The first and second horizontal posts include guide slots that are longitudinally aligned, with the guide slots receiving an alignment eye and leg within each slot to guide each post in a telescoping relationship. A winding reel is mounted within the "L" shaped junction, with the "L" shaped junction including an aperture aligned with each eye to effect a winding and reeling of the associated crab trap to the post structure.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved crab cage and pole apparatus which has all the advantages of the prior art crab cage apparatus and none of the disadvantages.

It is another object of the present invention to provide a new and improved crab cage and pole apparatus which may be easily and efficiently manufactured and marketed.

It is a further object of the present invention to provide a new and improved crab cage and pole apparatus which is of a durable and reliable construction.

An even further object of the present invention is to provide a new and improved crab cage and pole apparatus which is susceptible of a low cost of manufature with regard to both materials and labor, and which accordingly is then susceptible of low prices of sale to the consuming public, thereby making such crab cage and pole apparatus economically available to the buying public.

Still yet another object of the present invention is to provide a new and improved crab cage and pole apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention.

FIG. 2 is an isometric illustration of the invention in a bundled configuration for ease of transport and storage.

FIG. 3 is an orthographic cross-sectional illustration of the vertical pole portion of the instant invention.

FIG. 5 is an orthographic bottom view of the horizontal pole arrangement of the instant invention.

FIG. 6 is an orthographic view, taken along the lines 6—6 of FIG. 5 in the direction indicated by the arrows.

DESCRIPTION OF THE PREFERRED EMBODIMENT

Figure 4:
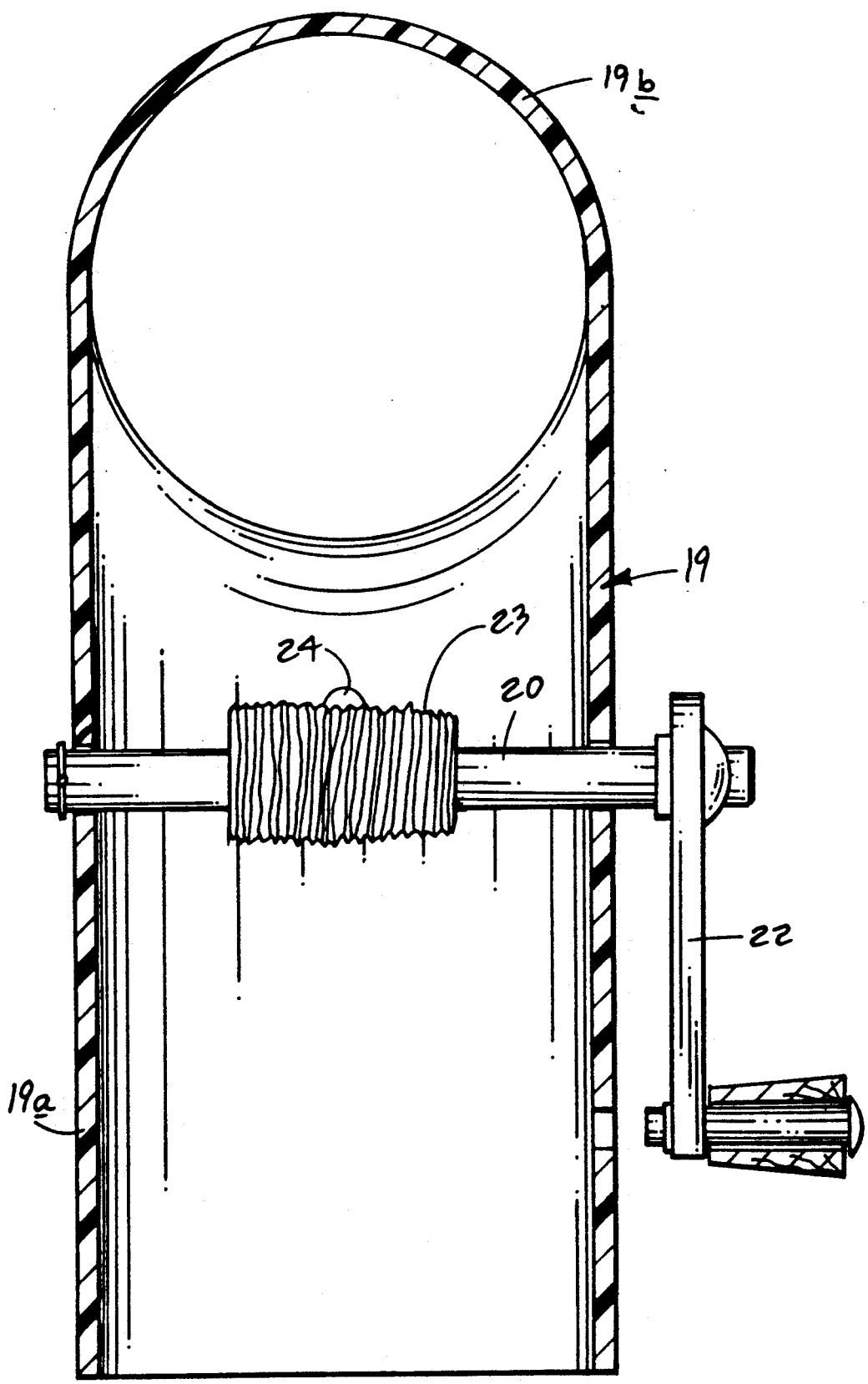
FIG. 4 is an orthographic view, taken along the lines 4—4 of FIG. 3 in the direction indicated by the arrows.

With reference now to the drawings, and in particular to FIGS. 1 to 6 thereof, a new and improved crab cage and pole apparatus embodying the principles and concepts of the present invention and generally designated by the reference numeral 10 will be described.

More specifically, the crab cage and pole apparatus 10 of the instant invention essentially comprises a vertical post assembly 11 that includes a first vertical post 12 coaxially mounted to an underlying second vertical post 13 through a medial junction sleeve 14. A mounting post 15 is secured to a lower terminal end of the second vertical post 13, wherein the mounting post 15 includes a pointed lower end 16 for projection within a ground support "G", as illustrated in FIG. 1. If desired, the first, second, and mounting posts may be telescopingly arranged relative to one another.

A horizontal post assembly 17 is mounted to the vertical post assembly 11 in a rotatable manner. Specifically, an "L" shaped junction 19 includes a junction vertical leg 19a rotatably receiving the upper terminal end of the first vertical post 12, with the horizontal leg 19b extending orthogonally oriented relative to the vertical junction leg 19a. A winding axle 21 is orthogonally directed through the vertical junction leg 19a, with an axial handle orthogonally mounted to the winding axle 21 positioned exteriorly of the vertical junction leg 19a. A tether line 23 is wound about the winding axle 21 and extends therefrom through an access aperture 24 directed radially through the vertical junction leg 19a adjacent an intersection of the vertical junction leg 19a with the horizontal junction leg 19b. The horizontal post assembly 17 includes a first horizontal post 25 fixedly mounted to the horizontal leg 19b and coaxially aligned therewith. The first horizontal post 25 telescopingly receives a second horizontal post 26, which in turn telescopingly receives a third horizontal post 27. The first, second, and third horizontal posts 25, 26, and 27 respectively are coaxially aligned relative to one another. A first guide slot 28 is formed within a bottom surface of the first horizontal post 25 and longitudinally aligned with a second guide slot 29 formed within a bottom surface of the second horizontal post 26. The second horizontal post 26 includes a first guide eye orthogonally mounted thereto that includes a first guide eye leg 30a positioned within the first guide slot 28. A second guide eye 31 that includes a second guide eye leg 31a is orthogonally directed through the second slot 29, with the second guide eye 31 coaxially aligned with the first guide eye 30, and wherein a third guide eye 32 is orthogonally mounted in coaxial alignment with the first and second guide eye members 30 and 31 respectively adjacent a forward terminal end of the third horizontal post 27 to receive the tether line 23 therethrough, with the tether line 23 mounting a cage member 33 at a lower terminal end thereof utilizing a hook or other suitable connector means. The central or horizontal axis 34 of the horizontal post assembly 17 is oriented in a parallel manner relative to the guide eye axis 35 directed through the first, second, and third guide eyes 30, 31, and 32 respectively.

In this manner, upon winding of the winding axle 21, the second and third horizontal posts are telescopingly retracted relative to the first horizontal posts to bring the cage member 33 closer to the vertical post assembly 11, whereupon the "L" shaped junction 19 is rotated to position the cage member 33 on the ground support "G" for ease of access thereto.

The FIG. 2 illustrates the use of a plurality of straps 18 to mount the organization in a disassembled configuration to permit ease of transport and storage thereof.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A crab cage and pole apparatus, comprising in combination,
    a vertical post assembly rotatably mounted to a horizontal post assembly, the vertical post assembly including a first vertical post coaxially aligned with a second vertical post, a junction sleeve securably mounting the first vertical post relative to the second vertical post, and a mounting post mounted to a lower terminal end of the second vertical post, the mounting post including a pointed lower end for projection of the lower pointed end within a ground support surface, and
    the horizontal post assembly orthogonally oriented relative to the vertical post assembly, and the horizontal post assembly including an "L" shaped junction sleeve, the "L" shaped junction sleeve including a vertical junction leg and a horizontal junction leg, the vertical junction leg rotatably receiving an upper terminal end of the first vertical post therewithin, and the vertical junction leg including a winding axle rotatably and orthogonally directed through the vertical junction leg, with the winding axle projecting exteriorly of the vertical junction leg and including an axle handle orthogonally mounted to the winding axle projecting through the vertical junction leg, and a tether line wound about the winding axle, and the tether line projecting through the vertical junction leg and slidably mounted to the horizontal post assembly, with the tether line including a remote terminal end spaced from the winding axle, with the remote terminal end mounting a crab cage member thereto.

2. An apparatus as set forth in claim 1 wherein the horizontal post assembly includes a first horizontal post fixedly and coaxially aligned with the horizontal junction leg, and the first horizontal post telescopingly receiving a second horizontal post therewithin, and the second horizontal post coaxially receiving a third horizontal post therewithin, and the first horizontal post, the second horizontal post, and the third horizontal post coaxially aligned along a central axis, and the first horizontal post including a first guide slot arranged parallel to the central axis, and the second horizontal post including a second guide slot arranged parallel to and aligned with the first guide slot and arranged parallel relative to the central axis, and the second horizontal post including a first guide eye fixedly mounted adjacent a rear terminal end of the second horizontal post and projecting through the first guide slot, and the third horizontal post including a second guide leg orthogonally mounted relative to the central axis to a rear terminal end of the second horizontal post and projecting through the second guide slot, and the first guide eye and the second guide eye each including a respective first loop and a second loop, wherein the first loop and second loop are coaxially aligned relative to one another, and the third horizontal post including a third guide eye, wherein the third guide eye includes a third loop coaxially aligned with the first loop and the second loop, wherein the first loop, the second loop, and the third loop define a further axis arranged parallel relative to the central axis, wherein the first loop, the second loop, and the third loop receive the tether line therethrough.

3. An apparatus as set forth in claim 2 wherein the vertical junction leg includes an axis aperture radially directed therethrough, wherein the axis aperture is positioned adjacent an intersection between the vertical junction leg and the horizontal junction leg, wherein the axis aperture is coaxially aligned with the first guide loop, the second guide loop, and the third guide loop.

* * * * *